US009514112B2

(12) United States Patent
Kaulback et al.

(10) Patent No.: US 9,514,112 B2
(45) Date of Patent: Dec. 6, 2016

(54) SYSTEM AND METHOD FOR REVEALING HIDDEN INFORMATION IN ELECTRONIC DOCUMENTS

(75) Inventors: Gordon Russell Kaulback, Washington, DC (US); Guggan Datta, Washington, DC (US)

(73) Assignee: Navigant Consulting, Inc., Chicago, IL (US)

( * ) Notice: Subject to any disclaimer, the term of this patent is extended or adjusted under 35 U.S.C. 154(b) by 59 days.

(21) Appl. No.: 12/939,621

(22) Filed: Nov. 4, 2010

(65) Prior Publication Data
US 2012/0117466 A1    May 10, 2012

(51) Int. Cl.
G06F 15/00 (2006.01)
G06F 17/24 (2006.01)
G06F 17/21 (2006.01)

(52) U.S. Cl.
CPC ........... *G06F 17/241* (2013.01); *G06F 17/211* (2013.01)

(58) Field of Classification Search
CPC .......................... G06F 17/241; G06F 17/211
USPC ......................................... 715/210, 277, 273
See application file for complete search history.

(56) References Cited

U.S. PATENT DOCUMENTS

| | | | | |
|---|---|---|---|---|
| 2003/0164859 | A1* | 9/2003 | Evans .......................... | 345/792 |
| 2005/0091302 | A1* | 4/2005 | Soin et al. ..................... | 709/200 |
| 2005/0132070 | A1* | 6/2005 | Redlich et al. ................ | 709/228 |
| 2005/0261891 | A1* | 11/2005 | Chan et al. .................... | 715/531 |
| 2006/0069733 | A1* | 3/2006 | Antonoff et al. ............. | 709/206 |
| 2006/0075041 | A1* | 4/2006 | Antonoff et al. ............. | 709/206 |
| 2007/0011149 | A1* | 1/2007 | Walker .............................. | 707/4 |
| 2007/0174766 | A1* | 7/2007 | Rubin et al. ............ | G06F 17/24 715/234 |
| 2008/0155302 | A1* | 6/2008 | Mue et al. .......... | G06F 11/1469 714/2 |
| 2009/0006990 | A1* | 1/2009 | Ossesia .......................... | 715/763 |
| 2010/0241516 | A1* | 9/2010 | Kim et al. ................. | 705/14.73 |

OTHER PUBLICATIONS

Jeffrey, Jones R., Document Metadata and Computer Forensics, James Madison University Infosec Techreport Department of Computer Science, Aug. 2006.*
SNAC, Hidden Data and Metadata in Adobe PDF Files: Publication Risks and Countermeasures, Enterprise Applications Division of the Systems and Network Analysis Center (SNAC) Information Assurance Directorate, Jul. 27, 2008.*
International Preliminary Report on Patentability dated May 8, 2013 for corresponding application No. PCT/US2011/001861.
International Search Report dated Jul. 9, 2012 for corresponding application No. PCT/US2011/001861.
Written Opinion of the International Searching Authority dated Jul. 9, 2012 for corresponding application No. PCT/US2011/001861.

\* cited by examiner

*Primary Examiner* — Nathan Hillery
(74) *Attorney, Agent, or Firm* — Nixon & Vanderhye, P.C.

(57) ABSTRACT

Methods, systems and computer readable medium allow a user to open an electronic document in one of various applications while revealing hidden information, without having to know or execute manual steps or procedures to reveal the hidden information. A user interface of a reveal hidden information application is displayed, the user interface displaying a list of one or more native applications each of which is associated with an electronic document type. An input is received selecting a first native application from the list, and one or more hidden information types are displayed corresponding to the selected native application. Settings for the hidden information types corresponding to the first native application are received. Using the first native application, an electronic document whose document type corresponds to the first native application is then displayed with hidden information revealed/not revealed in accordance with the settings.

25 Claims, 15 Drawing Sheets

Invoice

YOUR LOGO HERE

[Your company slogan]

[Your company slogan]
[Street Address]
[City, ST ZIP Code]
Phone[000-000-0000]
Fax[000-000-0000]
[e-mail]

[Enter a date]
Invoice # [100]

TO [Name]
[Company Name]
[Street Address]
[City, ST ZIP Code]
Phone[000-000-0000]
Customer ID[ABC123]

| Salesperson | Job | Payment Terms | Due Date |
|---|---|---|---|
| B. Jones | Job 334 | Due on receipt | |

| Qty | Description | Unit Price | Line Total |
|---|---|---|---|
| 10 | Pen | $12 | $1020 |
| 10 | Pencil | $0 | $0 |

Comment [NV1]: On receipt?

FIG. 12

| B | C | E | F |
|---|---|---|---|
| Description | Hours Approved | Date | |
| | 840 | | ← 540 |
| Total Payment | | | |
| Payment 1 | | 24-Jul-08 | |
| Payment 2 | | 24-Jul-08 | |
| | | 11-Oct-09 | |
| 2009 | 28.5 | | |
| 2009 | 88.5 | | |
| Total Payment | | 29-Jul-09 | |
| Payment | | | |
| Balance Payment | | | |
| | 105 | | |
| | 4 | | |
| | 4 | | |
| | 12 | | |
| on Dec 19, 2008 | | | |
| on Feb 19, 2009 | 40 | | |
| 2, 2009) | 8.5 | | |

542 → (arrow pointing to "Description Hours Approved Date" header)

FIG. 13

| B | C | D | E | F |
|---|---|---|---|---|
| | Description Hours Approved | Amount | Date | |
| | 840 | =C3*12.5 | | |
| | Total Payment | =SUM(D3:D3) | 39653 | |
| | Payment 1 | 2500 | 39653 | |
| | Payment 2 | 3431.25 | 40097 | |
| | Balance Payment | =D4-D5-D6 | | |
| | 28.5 | =C9*12.5 | | |
| | 88.5 | =C10*12.5 | | |
| | Total Payment | =SUM(D9:D10) | 40023 | |
| | Payment | 0 | | |
| | Balance Payment | =D11-D12 | | |

SYSTEM AND METHOD FOR REVEALING HIDDEN INFORMATION IN ELECTRONIC DOCUMENTS

The subject application generally relates to systems and methods for revealing hidden information in electronic documents.

Electronic documents produced on computers often include information that may not be visible to an end user when the document is opened. This hidden information may include hidden rows or columns in a chart, track changes in a document, hidden comments or versions, hidden worksheets, metadata concerning a document, objects that are formatted as invisible, presentation notes, etc. By way of further example, hidden information or data in word processing documents can include author and business/organization names, print and save dates, names/initials of persons who have reviewed, edited and/or saved a document, and the directory path where a document is saved on a local or network drive. Because this information is hidden, people often are not aware that such information is present in a document or that, when a document is sent to others, such information can be "revealed" by recipients.

A document is typically opened in the original application in which it was created. For example, a Microsoft Word® document may be created and saved in a .doc or .docx format, and will typically be opened using Microsoft Word® or a compatible program. However, it may be difficult for a user to reveal all hidden information in such a program so that it may be reviewed. For example, to reveal hidden information, a user may have to go to one or more menus to manually select one or more types of hidden information to be revealed. To reveal hidden text and comments, a user must be aware of the two different dropdown menus needed to reveal the hidden text and the hidden comments, and then go to the two different drop down menus and make appropriate menu selections (e.g., by selecting/unselecting check boxes). This task becomes even more difficult when the user is reviewing documents in multiple different native formats, (e.g., a word processing format and a spreadsheet format), and these formats have different types of hidden information, and revealing these different types of hidden information requires different steps or procedures to be performed.

Lexis LAW PreDiscovery™ allows users to convert electronic documents from a native format to a TIFF (Tagged Image File Format) format. After a user has selected to convert an electronic document to the TIFF format, a selection of the types of hidden information to be revealed can be made only. The converted document is then saved in the TIFF format, and can be opened in an application able to open TIFF documents, such as a TIFF viewer application.

BRIEF DESCRIPTION OF THE DRAWINGS

The accompanying drawings facilitate an understanding of the various embodiments of this technology. In such drawings:

FIG. 12 illustrates an electronic document having hidden information revealed according to disclosed embodiments.

FIG. 13 illustrates an electronic document having hidden information.

FIG. 14 illustrates an electronic document having hidden information revealed according to disclosed embodiments.

DETAILED DESCRIPTION OF EXAMPLE EMBODIMENTS

Figure 1:
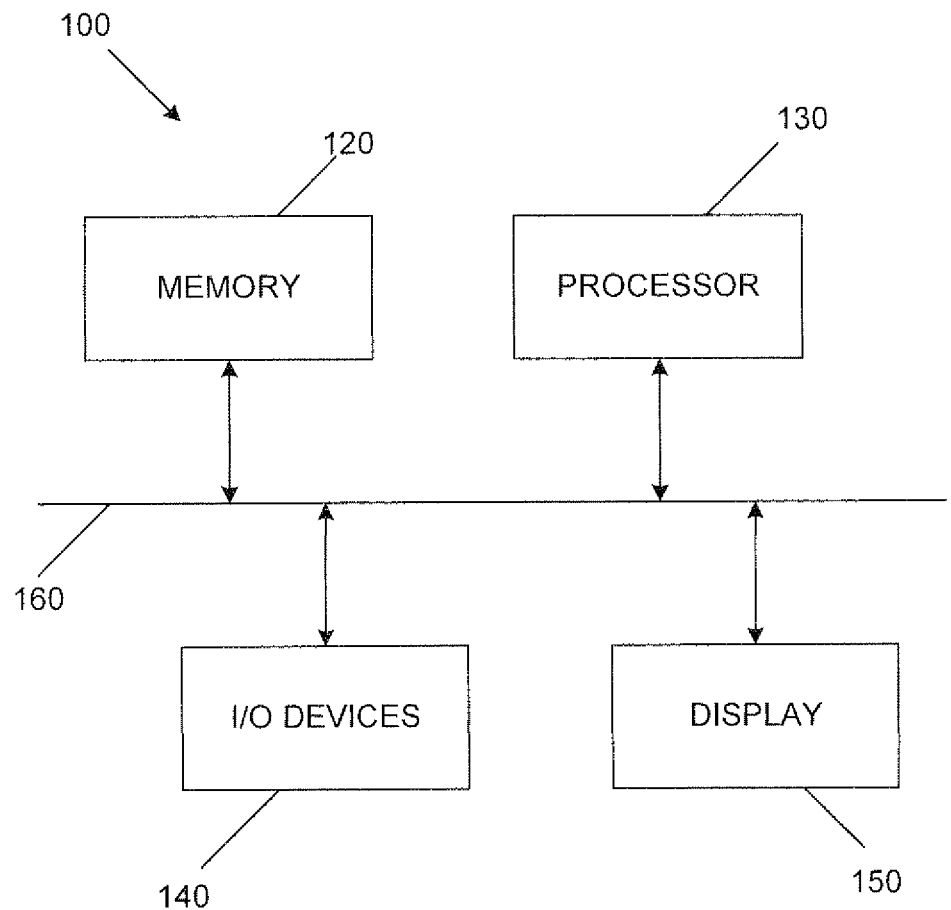
FIG. 1 is a generalized block diagram of a system in which the methods described herein can be used.

Aspects of the embodiments disclosed herein relate to systems and methods of revealing hidden information in electronic documents.

The term "application" in the disclosed embodiments refers to a program designed for end users of a computing device, such as a word processing program, a database program, a spreadsheet program, and the like. An application is distinct from systems programs, which consist of low-level programs that interact with the computing device at a very basic level, such as an operating system program, a compiler program, a debugger program, programs for managing computer resources, and the like. This patent application describes an application for revealing hidden information. This application for revealing hidden information can be used with other applications, examples of which include, but are not limited to spreadsheet applications (e.g., Excel®, Lotus® and the like), word processing applications (e.g., Word®, WordPerfect and the like), presentation applications (PowerPoint®), and document management applications (e.g., Acrobat®, from Adobe Systems Incorporated).

"Hidden information" includes any information that is not visible to a user when an electronic document is opened. The hidden information may include information that is intentionally or unintentionally hidden in the electronic document by the user. For example, a user may format text as hidden or format text as white text on a white background. The hidden information may further include information that is hidden by an application the electronic document is created in, modified in, or otherwise opened or used in, whether or not the user knows of such hidden information. The hidden information may also include information that is hidden by a computerized device or a network that the electronic document is stored in, created in, modified in, or otherwise opened or used in, whether or not the user knows of such hidden information. Hidden information may include information that has been selected to be revealed through manual steps, (e.g., where manual selection has been made to reveal text formatted as hidden). Microsoft provides information its Office program suite identifying data such as the following which may be hidden in documents created in its Word®, Excel® and PowerPoint® application programs; user's name; user's initials; user's company or organization name; the name of the user's computer; the name of the network server or hard disk where the user saves the document; other file properties and summary information; non-visible portions of embedded OLE objects; the names of previous document authors; document revisions; document versions; template information; hidden text or cells; personalized views; and comments. These types of hidden information or data are provided by way of example and without limitation and the systems and methods described herein may be used to reveal these and other types of hidden information.

The above-described hidden information can be difficult or confusing for a user to find and/or reveal. For example, electronic documents created in applications may include information that a user may want to review, but some or all of the information may be hidden when the user opens the electronic document. A user may need to review this hidden information to determine if it should be removed before sending the electronic document to another person or organization, for example.

Further, a user may want to review an electronic document created by another person or organization, and see all hidden information in the electronic document. Often, such hidden information may be manually revealed (e.g., by making manual menu selections), but may require the user to know steps or procedures that the user needs to perform in the application that allow such hidden information to be manually revealed. Further, each application may have different types of hidden information, and revealing these different types of hidden information may require different steps or procedures to be performed within the respective application. This problem is made even worse when a user is working with electronic documents created in different applications, and each application has multiple different types of hidden information, each requiring different steps or procedures be executed to reveal the hidden information.

The systems and methods described herein allow a user to open an electronic document in one of various applications while revealing hidden information, without the user having to know or execute manual steps or procedures to reveal the hidden information within the respective applications. In one example, a hidden information settings user interface displays a list of user selectable applications. A user selects one of the applications, and one or more hidden information types are displayed corresponding to the selected application. The user then selects which types of the hidden information to reveal. For example, the user may make selections via check boxes, radio buttons, drop-down Lists, text boxes and the like. Thereafter, electronic documents opened in the selected application are displayed in accordance with the user selections.

The reveal hidden information application allows a user to easily reveal hidden information in electronic documents native to a plurality of different applications. The reveal hidden information settings user interface allows a user to select from a plurality of different applications, and for each application be presented with choices of all the hidden information types for that application. The user does not have to know of all the different types of hidden information for each application, since they are presented to the user in the interface. Further, the user does not have to know how to manually reveal each of the types of hidden information, but can instead just select from the interface the types of hidden information the user wants to reveal.

As described in greater detail below, while in the reveal hidden information application, a user may select hidden information types for a word processing application and for a spreadsheet application, and thereafter when the user opens an electronic document in the word processing application or the spreadsheet application, hidden information corresponding to the selected hidden information types selected in the reveal hidden information application is revealed.

FIG. 1 illustrates a diagram of a system 100. The system 100 may be embodied within a computing device. For example, the computing device may be a desktop computer, a laptop computer, a handheld computer, a handheld communication device, a cell phone, a personal digital assistant (pda), or another type of computing device, or the like. The system 100 may include a memory 120, a processor 130, input/output (I/O) devices 140, a display 150 and a bus 160. The bus 160 may permit communication and transfer of signals among the components of the computing device 100.

Processor 130 may include at least one conventional processor or microprocessor that executes instructions. The processor 130 may be a general purpose processor or a special purpose integrated circuit, such as an ASIC, and may include more than one processor section. Additionally, the system 100 may include a plurality of processors 130.

Memory 120 may be a random access memory (RAM) or another type of dynamic storage device that stores information and instructions for execution by processor 130. Memory 120 may also include a read-only memory (ROM) which may include a conventional ROM device or another type of non-volatile storage device that stores information and instructions for processor 130. The memory 120 may be any memory device (e.g., semiconductor memory) that stores data for use by system 100, and may comprise a non-transitory computer readable medium having encoded therein instructions for revealing hidden information in an electronic document.

Input/output devices 140 (I/O devices) may include one or more conventional input mechanisms that permit a user to input information to the system 100, such as a microphone, touchpad, touch screen, keypad, keyboard, mouse, pen, stylus, voice recognition device, buttons, etc., and output mechanisms such as one or more conventional mechanisms that output information to the user, including a display (note that display 150 is separately shown), one or more speakers, a storage medium (or storage media), such as a semiconductor memory device, a magnetic, optical or magneto-optical device, disk drive, a printer device, etc., and/or interfaces for the above. The display 150 may typically be an LCD or CRT display as used on many conventional computing devices, or any other type of display.

The system 100 may perform functions in response to processor 130 by executing sequences of instructions or instruction sets contained in a computer-readable medium, such as, for example, memory 120. Such instructions may be read into memory 120 from another a storage device, or from a separate device via a communication interface, or may be downloaded from an external source such as the Internet. The system 100 may be a stand-alone system, such as a personal computer, or may be connected to a network such as an intranet, the Internet, or the like.

The memory 120 may store instructions that may be executed by the processor 130 to perform various functions. For example, the memory 120 may store instructions to allow the system to perform various functions in association with a particular application, such as display or manipulation of electronic documents.

Figure 2:
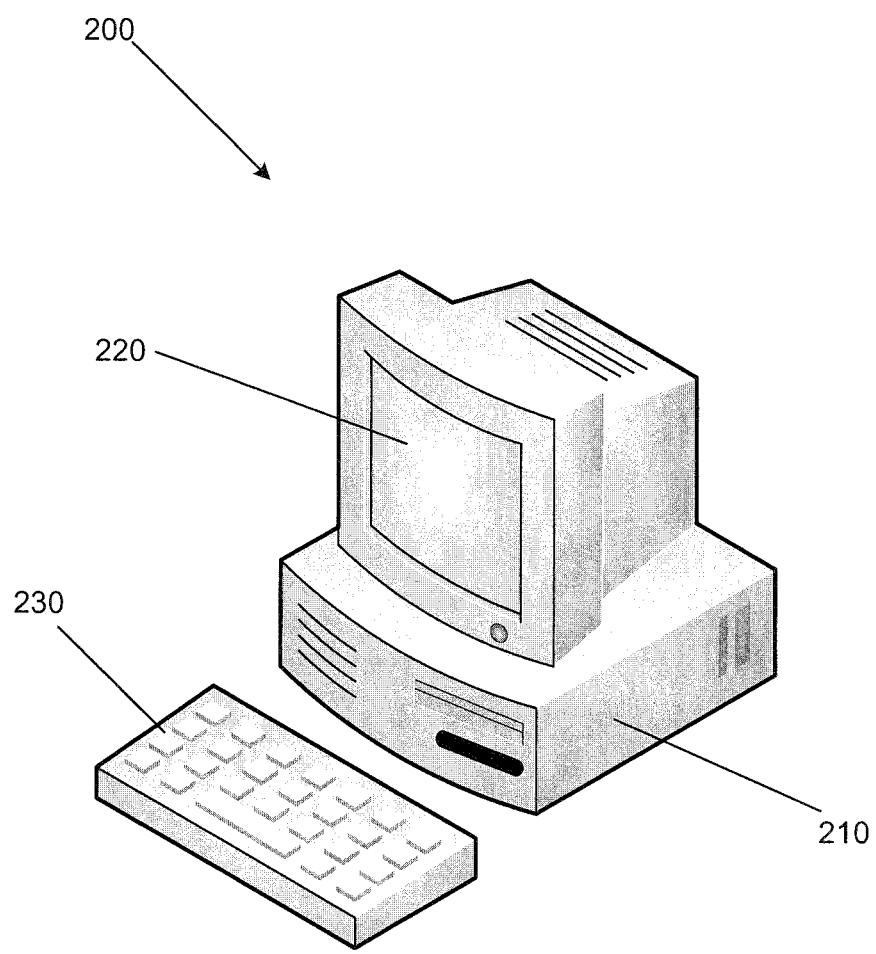
FIG. 2 shows an example of a system in which the methods described herein can be used.

FIG. 2 illustrates a system 200. The system 200 includes a computer 210, which includes the elements of system 100, including the memory 120, the processor 130, I/O devices 140 and a display 150. The computer 210 could be a standard personal computer, or could be another type of computing device such as a handheld computer, a cell phone, a laptop computer, or the like.

The system 200 may also include a keyboard 230 functioning as an input device. The keyboard 230 may be replaced or supplemented by the input devices as illustrated and described in conjunction with FIG. 1. The keyboard 230 may be a stand alone device, or may be integrated in one device with the computer 210.

Display 220 functions as an output device for displaying images generated or received by the computer 210, corresponding to display 150 shown in FIG. 1. The display 220 may display images to be viewed by a user, such as various application programs, a user interface (UI), text, photographic images, or the like. For example, the display may display a user interface or electronic documents in response to instructions stored in memory 120. An application and/or instructions could also be stored in a memory that the computer 210 is connected to, such as in a network server, or a portable memory connected to the computer 210.

The system 200 may be connected to a network, such as such as an intranet, the Internet, a wireless network, a phone network, or the like. In addition, the system 200 may be connected to a plurality of displays such as display 220. The plurality of displays may be of a same display type or of varying display types.

Figure 3:
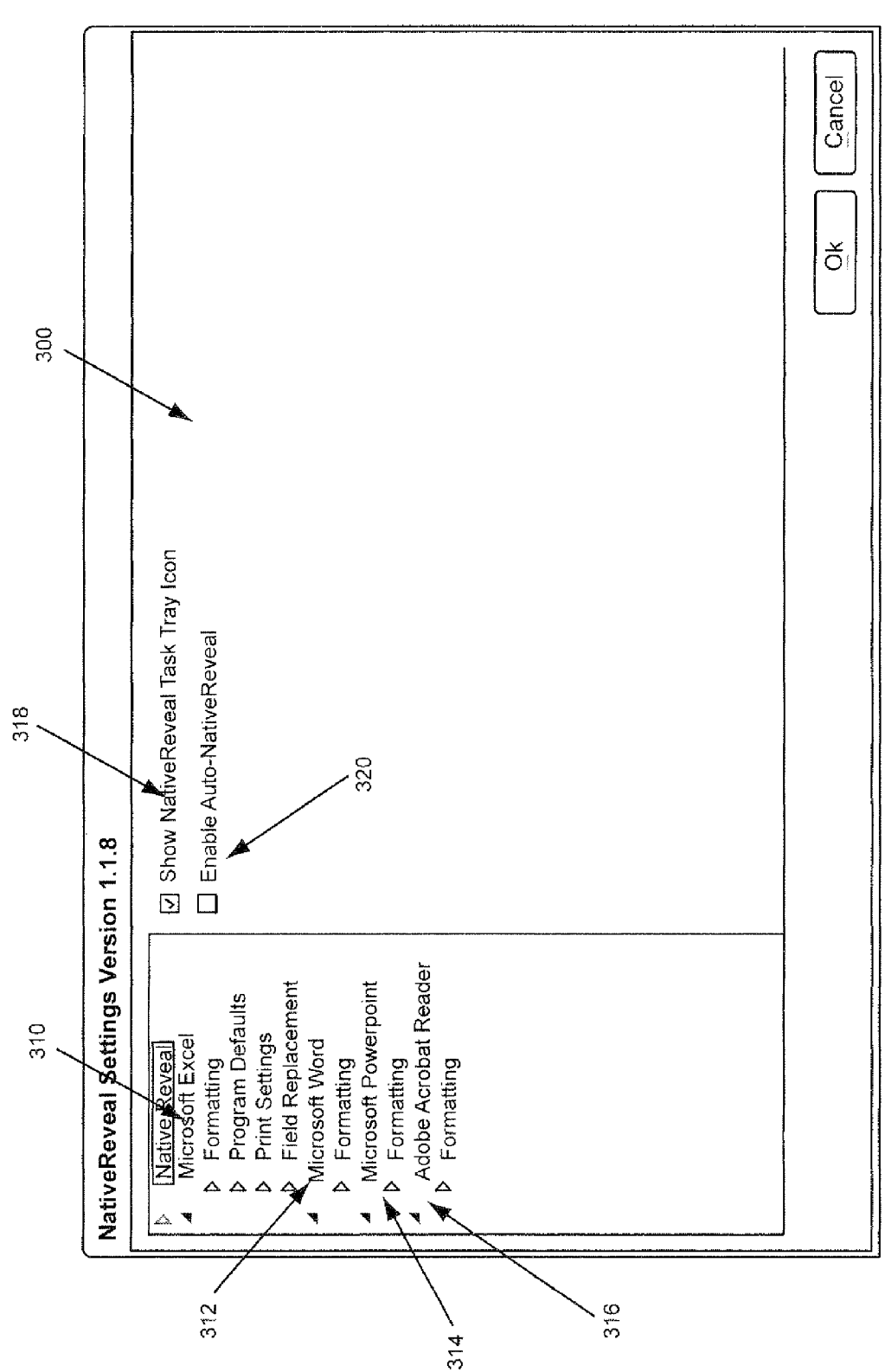
FIG. 3 is an illustrative settings user interface which may be utilized with the systems and methods described herein.

FIG. 3 illustrates an example user interface 300 that may be displayed on a display of a computerized device, such as computer 210. The user interface 300 may be a user interface of a reveal hidden information application, adapted to allow a user to select settings to be used with a variety of different native applications. For example, the user interface 300 is adapted to allow a user to individually select hidden information settings and formatting settings for each of a plurality of native applications, including Excel® application 310, Word™ application 312, PowerPoint® application 314, and Acrobat® application 316. For each of the applications 310-316, the user may select hidden information settings (indicated as formatting), while the Excel® settings 310 also include program defaults, print settings and field replacement. The illustrated selectable hidden information settings for each of the applications are only examples, and other selectable hidden information settings could be used. Additionally, the Excel® application 310, Word™ application 312, PowerPoint® application 314, and Acrobat® application 316 are only examples, and other applications could be used.

Figure 4:
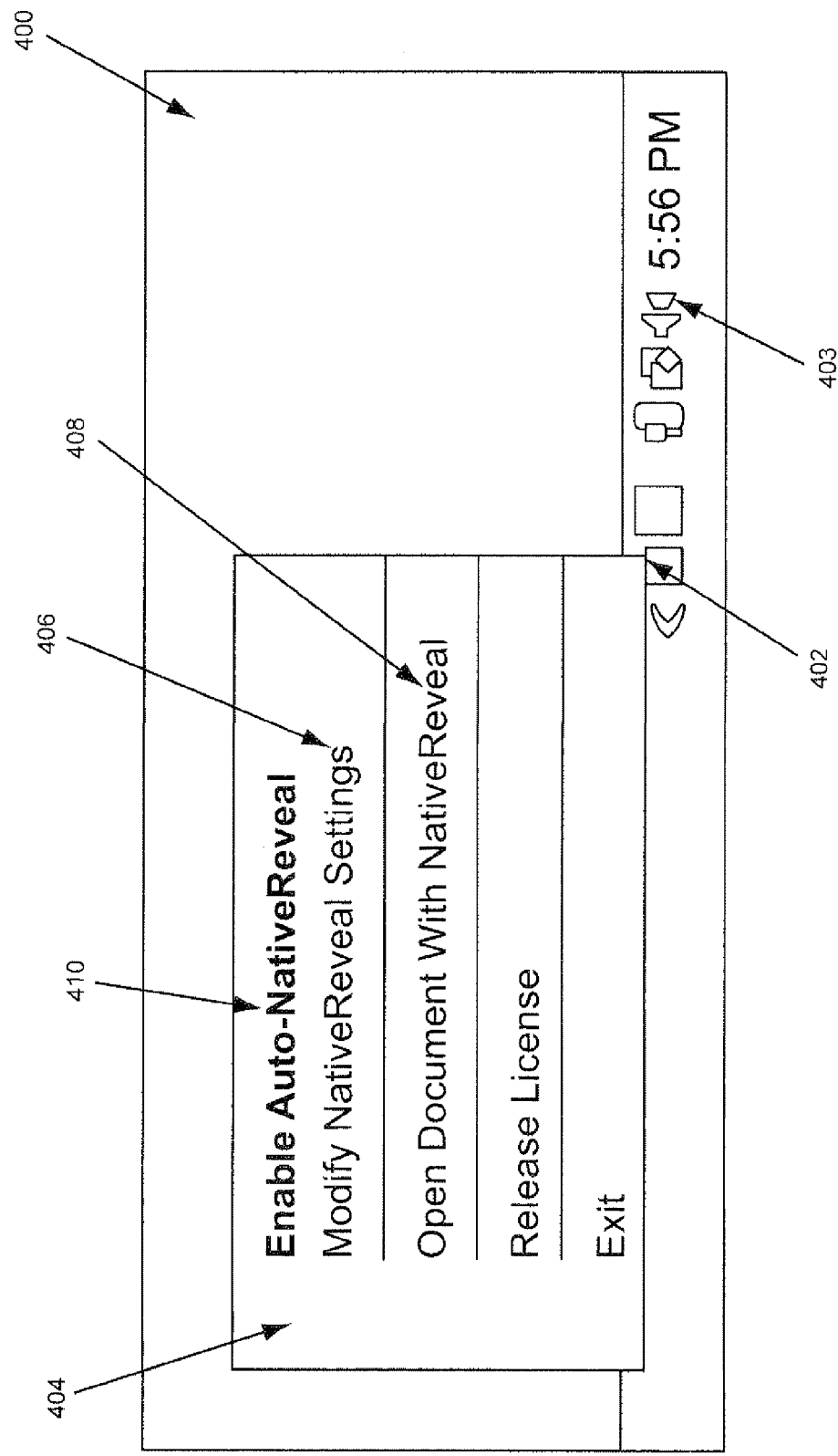
FIG. 4 is a partial screenshot of a user display illustrating a display tray icon.

The user interface 300 may be invoked by a user in a variety of ways, and displayed on display 220. For example, FIG. 4 illustrates a portion 400 of a user screen that may be displayed on display 220. When the reveal hidden information application program is running on computer 210, it may display a tray icon 402 in a tray area 403 of the screen. When a user selects the tray icon 402, such as by a right click or a left click with a mouse, selection box 404 is displayed. The selection box 404 includes various selections that a user may choose, including Modify Settings 406, which upon selection by the user, causes user interface 300 to be displayed. The selection box 404 also includes Open Document with reveal hidden information application 408 and Enable Auto-reveal hidden information 410.

Figure 5:
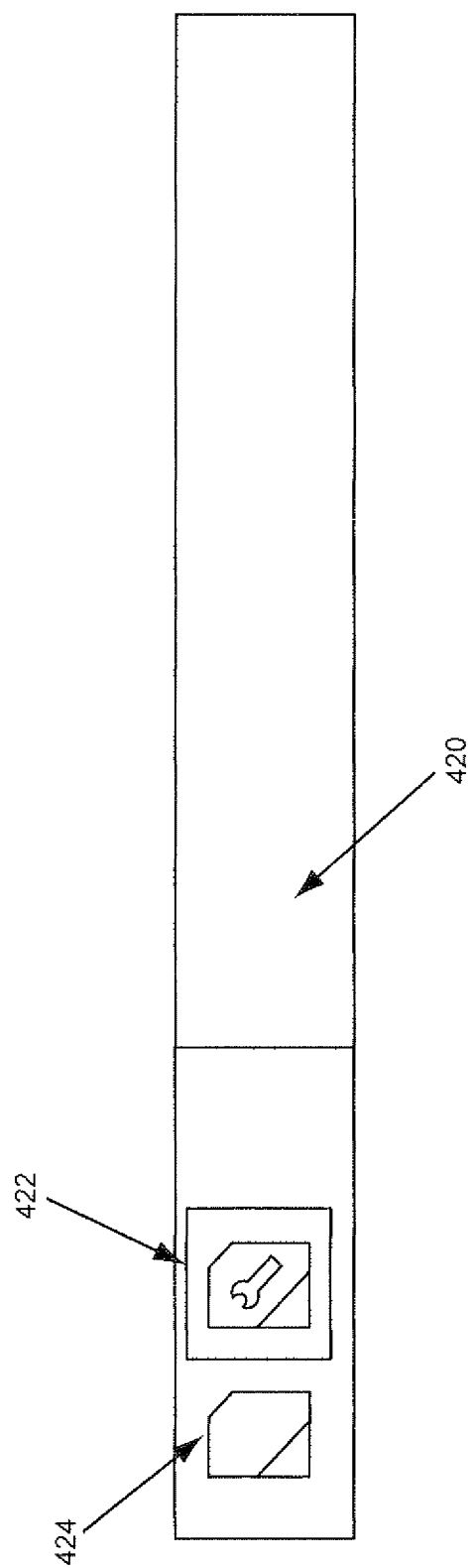
FIG. 5 is a partial screenshot of a user display illustrating a toolbar including a hidden data settings icon and a reveal document icon.

As illustrated in FIG. 5, instructions loaded into the memory and executed by the processor may also cause display of a toolbar 420 on a screen of the user's display, which may be in addition to the tray icon 402. The toolbar 420 may include a hidden information settings icon 422, which when selected by a user causes the user interface 300 to be displayed. The toolbar 420 may also include a reveal document icon 424, discussed further below.

Figure 6:
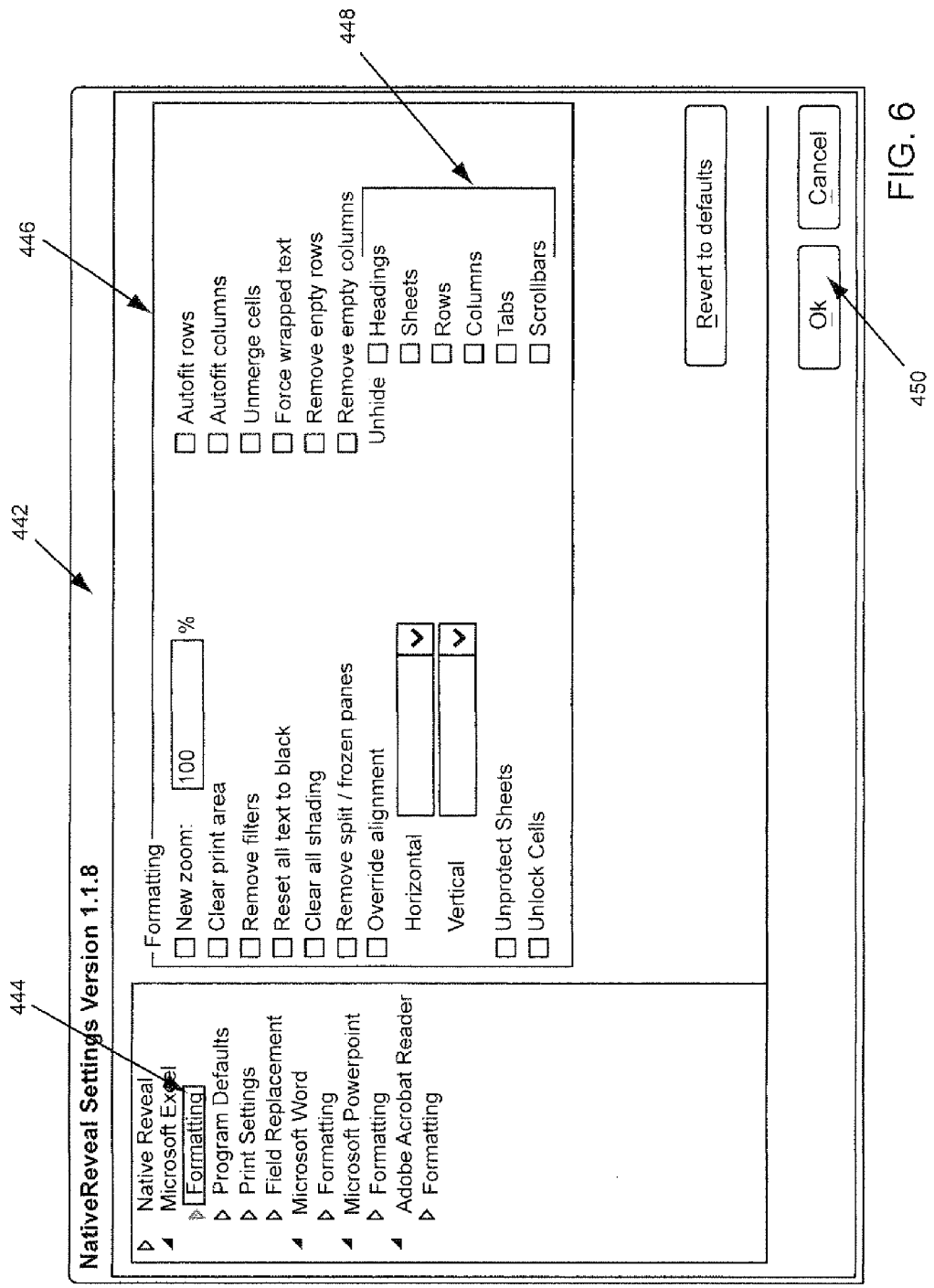
FIG. 6 illustrates a formatting user interface that includes a plurality of types of selectable hidden information for an application.

The Excel® formatting user interface 442 is displayed when a user selects the formatting selection 444 for Excel® from the user interface 300, as illustrated in FIG. 6. The Excel® formatting user interface 442 includes a plurality of selectable attributes 446 of an Excel® electronic document that will affect how the electronic document is displayed when opened with the reveal hidden information application program. Some of the selectable attributes 446 will function to reveal hidden information in an Excel® electronic document, including at least the hidden data types 448 for revealing hidden headings, hidden rows, hidden sheets, hidden columns, hidden tabs and hidden scrollbars. Additionally, other ones of the selectable attributes 446 may reveal hidden information, such as the illustrated remove filters, reset all text to black, clear all shading, unprotect sheets, and unlock cells. The illustrated hidden information types 448 are only examples, and other hidden information types could be used.

Others of the selectable attributes 446 may not reveal hidden information, but may instead affect how the Excel® electronic document is displayed. For example, the user may select a zoom setting, autofit rows and columns, override horizontal or vertical alignment, remove split/frozen panes, remove empty rows or columns, and the like. The user can select revert to defaults to revert to default settings of the Excel® formatting user interface 442. Once the user selects the selectable attributes 446, including those that unhide information in an electronic spreadsheet document, selection of the ok button 450 will save the settings for Excel® electronic documents, and close the Excel® formatting user interface 442. The user can at any time change the selectable attributes 446, by opening the Excel® formatting user interface 442, and selecting the selectable attributes 446 as desired.

Figure 7:
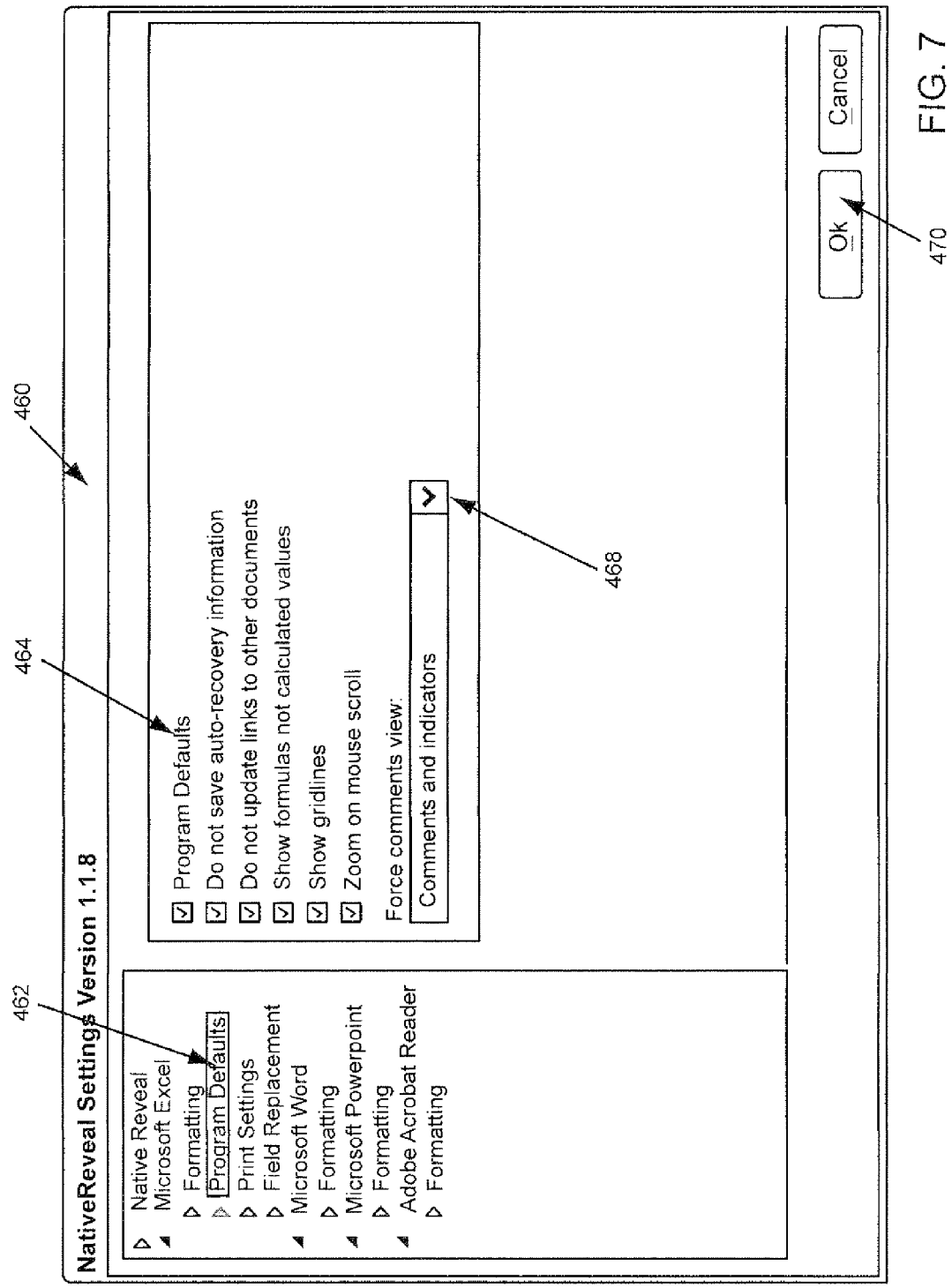
FIG. 7 illustrates a formatting user interface that includes a plurality of types of selectable hidden information for an application.

The Excel® program defaults user interface 460 is displayed when a user selects the program defaults selection 462 for Excel® from the user interface 300, as illustrated in FIG. 7. The Excel® program defaults user interface 460 includes program defaults selections 464, which are selectable by a user, and at least some of which function to reveal hidden information in an Excel® electronic document when selected, such as show formulas not calculated values and show gridlines. The Excel® program defaults user interface 460 also includes a force comments view dropdown 468, which, when selected provides the user with various selections to force display of otherwise hidden comments or indicators, including the choices of no comments or indicators, indicators only and comments on hover, or comments and indicators.

Figure 8:
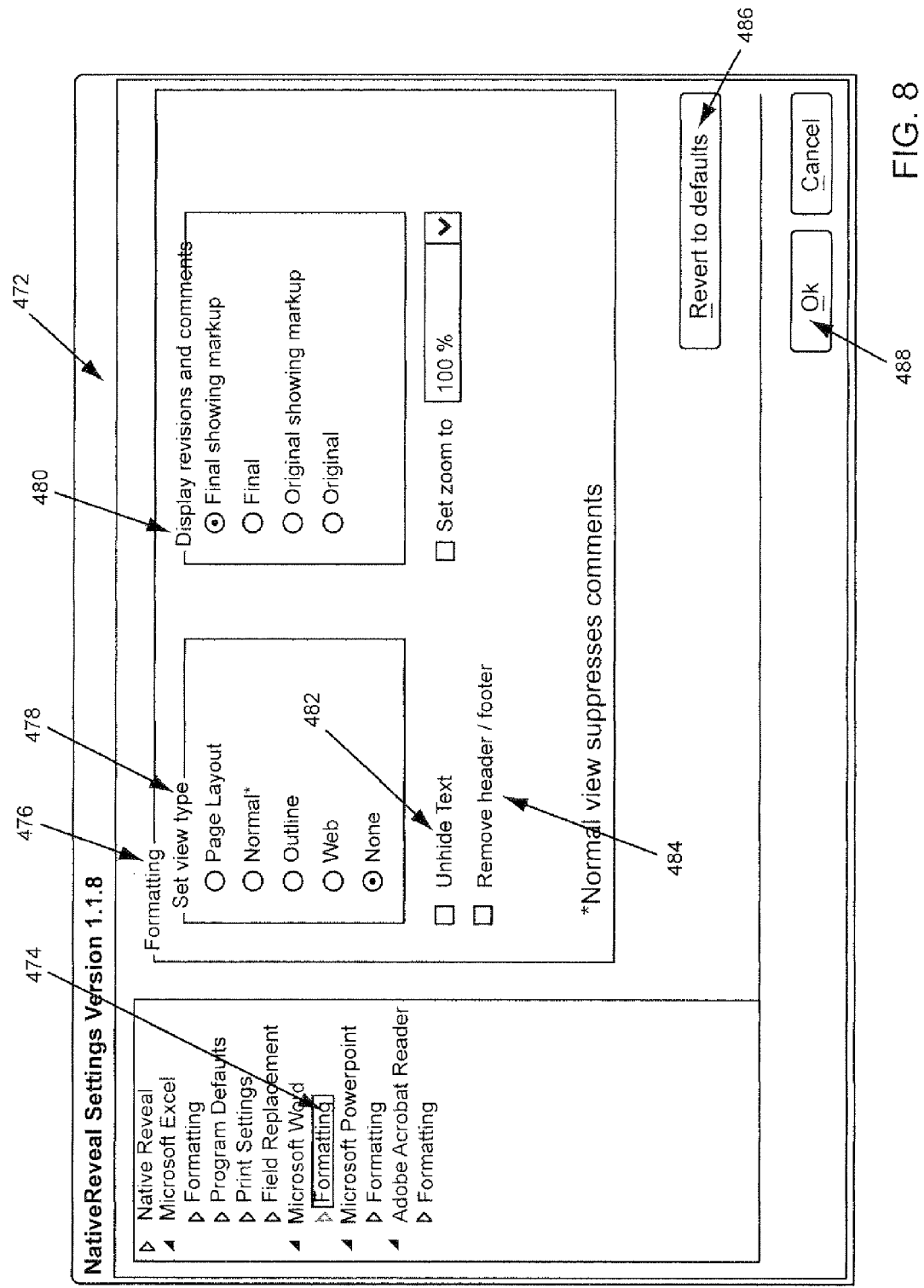
FIG. 8 illustrates a formatting user interface that includes a plurality of types of selectable hidden information for an application.

The Word® formatting user interface 472 is displayed when a user selects the formatting selection 474 for Word® from the user interface 300, as illustrated in FIG. 8. The Word® formatting user interface 472 includes a plurality of selectable formatting selections 476, at least some of which function to reveal hidden information for a Word® electronic document displayed when opened with the reveal hidden information application program.

The formatting selections 476 include set view type 478, display revisions and comments 480, unhide text 482 and remove header/footer 484. The Word® formatting user interface 472 also includes a revert to defaults, which will cause all settings on the Word® formatting user interface 472 to revert to default settings 486 of the formatting selections 476, and an ok selection 488, which will save all selected settings on the Word® formatting user interface 472.

The selectable choices under display revisions and comments 480 when selected cause otherwise hidden information to be revealed in a Word® electronic document, including revisions, comments and users from track changes. The unhide text 482 when selected causes otherwise hidden text (text formatted as "hidden text") to be revealed in a Word® electronic document. The illustrated hidden information types are only examples, and other hidden information types could be used.

Figure 9:
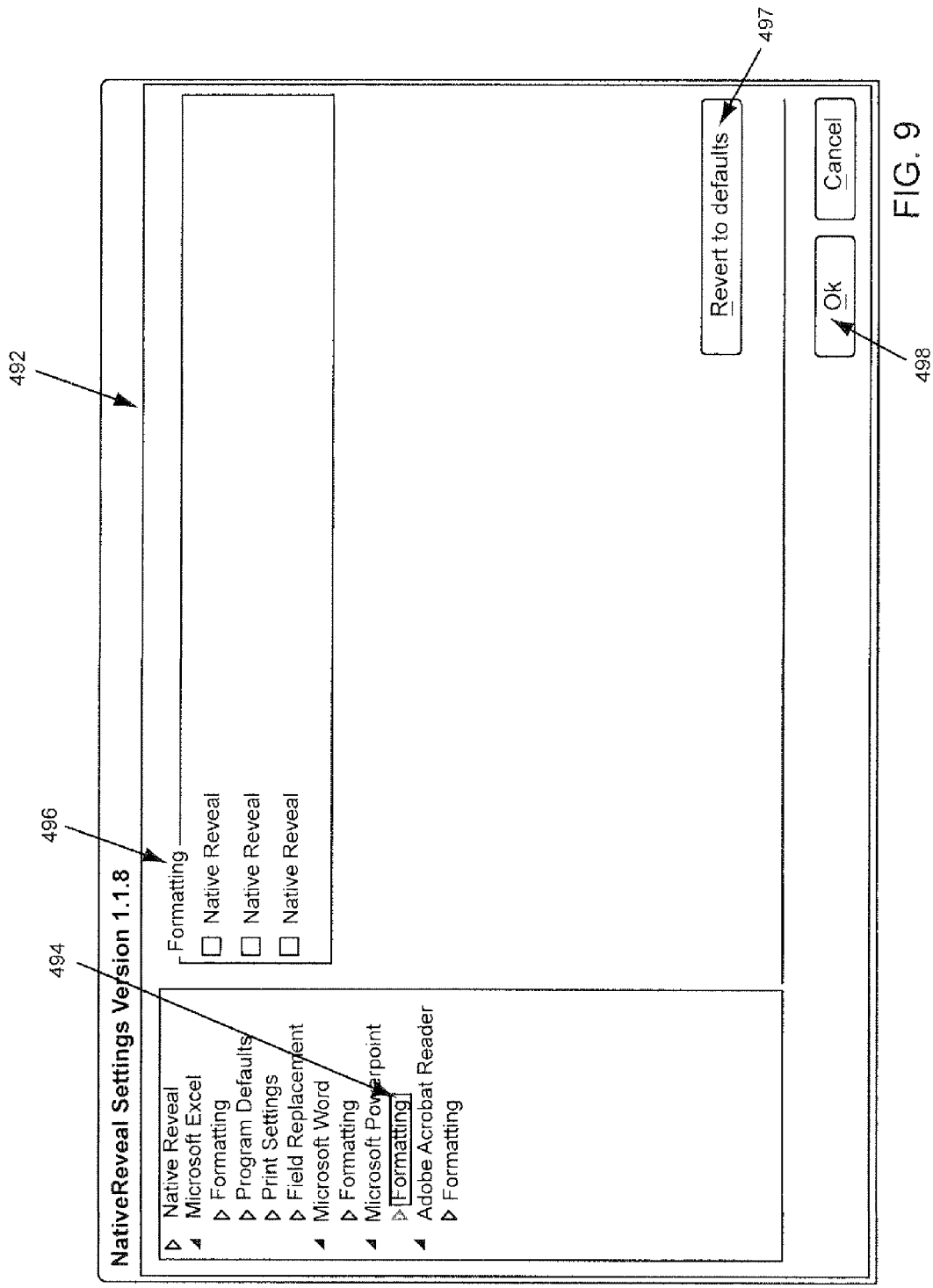
FIG. 9 illustrates a formatting user interface that includes a plurality of types of selectable hidden information for an application.

The PowerPoint® formatting user interface 492 is displayed when a user selects the formatting selection 494 for PowerPoint® from the user interface 300, as illustrated in FIG. 9. The PowerPoint® formatting user interface 492 includes hidden information types 496 (formatting selections), which include unhide slides, unhide shapes and objects, and force notes view, and when selected cause otherwise hidden information to be revealed in a PowerPoint® electronic document. The illustrated hidden information types 496 are only examples, and other hidden information types could be used.

The PowerPoint® formatting user interface 492 also includes a revert to defaults 497, which will cause all settings on the PowerPoint® formatting user interface 492 to revert to default settings of the formatting user interface 492, and an ok selection 498, which will save all selected settings on the PowerPoint® formatting user interface 492.

Figure 10:
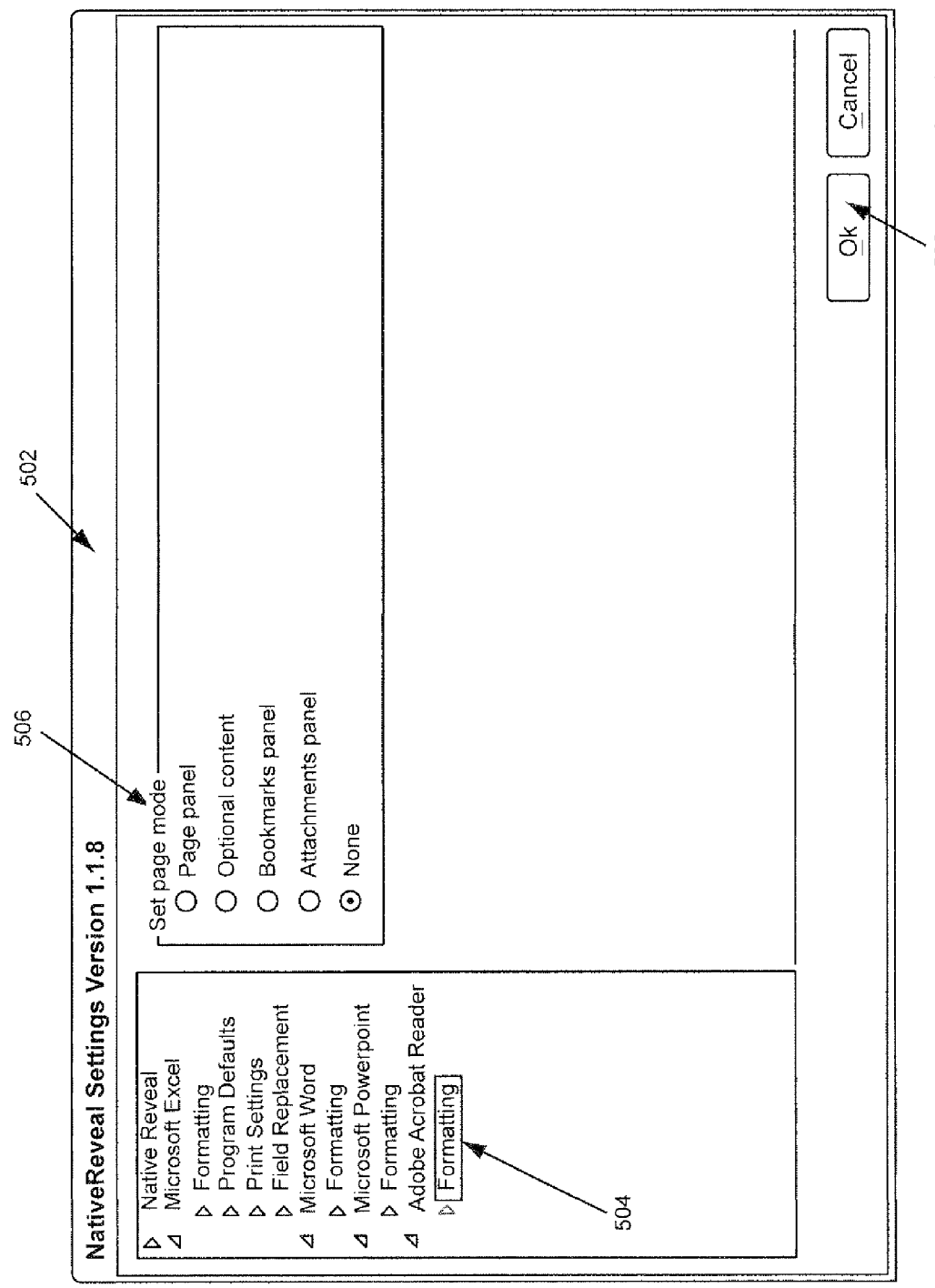
FIG. 10 illustrates a formatting user interface that includes a plurality of types of selectable hidden information for an application.

The Acrobat® formatting user interface 502 is displayed when a user selects the formatting selection 504 for Acrobat® from the user interface 300, as illustrated in FIG. 10. The Acrobat® formatting user interface 502 includes hidden information types 506 (set page mode), which include pages panel, optional content, bookmarks panel and attachments panel, and when selected cause otherwise hidden information to be revealed in an Acrobat® electronic document. In particular, these hidden information types 506 can cause a pages panel, optional content, a bookmarks panel and/or an attachments panel to be revealed in an Acrobat® electronic document. The ok selection 508 saves all selected settings on the Acrobat® formatting user interface 492. The illustrated hidden information types 506 are only examples, and other hidden information types could be used.

Figure 11:
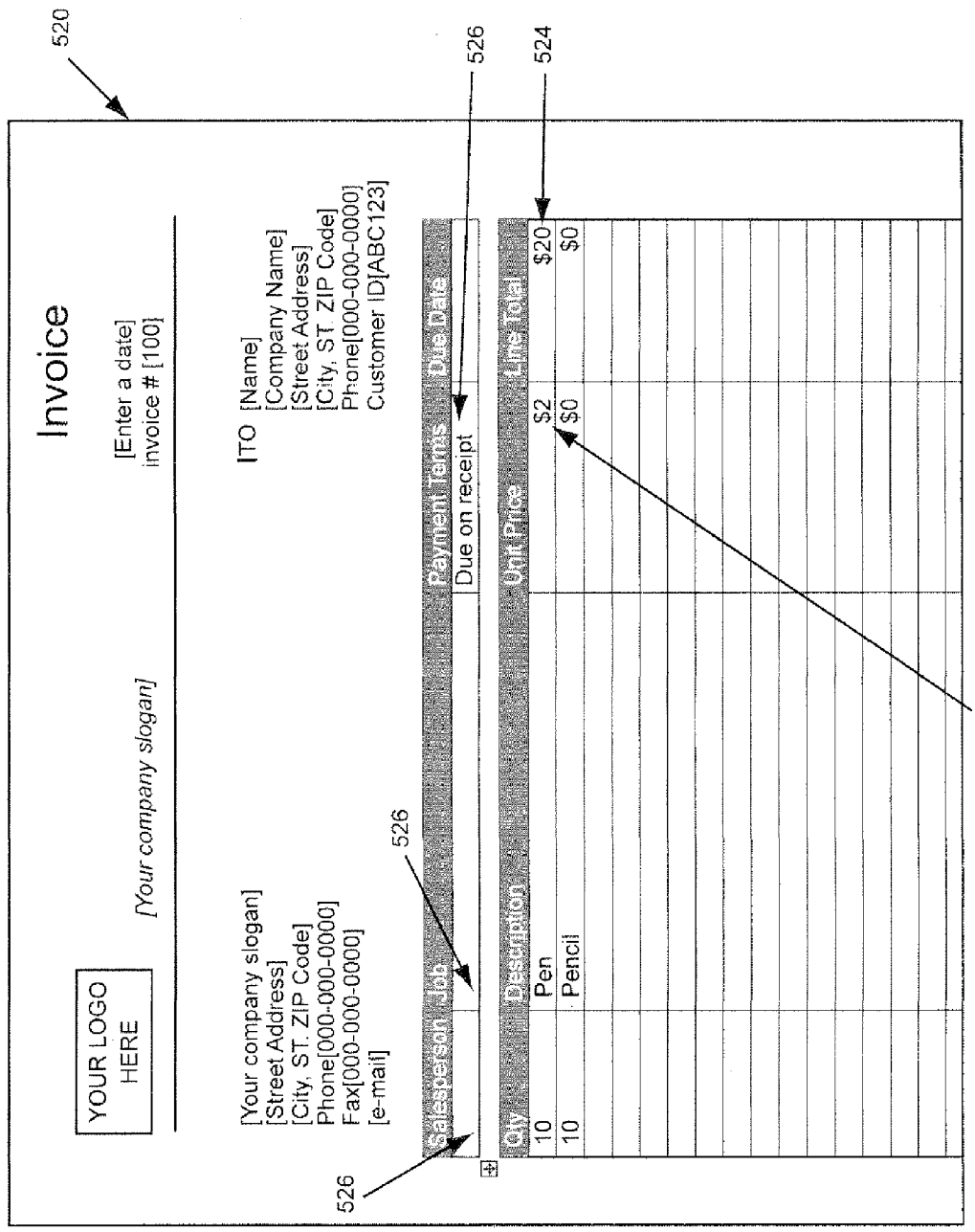
FIG. 11 illustrates an electronic document having hidden information.

An electronic document 520 is illustrated in FIG. 11. The electronic document 520 may be a Word® electronic document. The electronic document 520 includes information that may be displayed on a display device, such as text information 522 and 524. The electronic document 522 also includes hidden information 526, in this case at three different locations.

The hidden information in the electronic document 522 may be revealed on a display of a device such as computer 210 having loaded into its memory the reveal hidden information application. The hidden types of information in the example electronic document 522 are hidden text and hidden comments and track changes, although other types of hidden information could be included. A user may reveal the hidden information in document 522 by selecting the unhide text 482 and final showing markup of display revisions and comments 480, selecting ok 488 of FIG. 8. The document may be opened in the reveal hidden information application, which may be done by selecting open document with reveal hidden information 408, or selecting the reveal document icon 424 and then selecting to open electronic document 522. Alternatively, or selecting enable auto-NativeReveal™ 410 may be enabled, in which case, any documents opened in an application having corresponding hidden information types saved for that native application will automatically be opened with any hidden information corresponding to the selected hidden information types revealed/not revealed in dependence on the user selections made via the example menus shown in FIGS. 6-9.

An electronic document 530 is illustrated in FIG. 12. The electronic document 530 includes revealed information from electronic document 522 illustrated in FIG. 11, including track changes information 532 and 534, hidden text 535 and 536, and comments 538.

An electronic document 540 is illustrated in FIG. 13. The electronic document 540 may be an Excel® electronic document. The electronic document 540 includes information that may be displayed on a display device, and includes hidden information. The hidden information may be a hidden column D 542, which may include data calculated by hidden formulas.

The hidden information in the electronic document 540 may be revealed on a display of a device such as computer 210 having loaded into its memory the reveal hidden information application. A user may reveal the hidden information in document 540 by selecting the unhide columns from selectable attributes 446 of FIG. 6, and selecting show formulas not calculated values from program defaults 464 of FIG. 7, selecting ok 488, and opening the document using the reveal hidden information application as described above.

An electronic document 544 is illustrated in FIG. 14. The electronic document 544 includes revealed information from electronic document 540 illustrated in FIG. 13, unhidden column information 546 in column D, and formulas and calculated values 548.

The reveal hidden information application allows a user to select from one interface hidden information types for hidden information that the user wants to reveal in electronic documents native to each of a plurality of different applications. When an electronic document native to one of the applications is opened using the selected hidden information types, the reveal hidden information application may open the electronic document, create a modified version of the electronic document with the hidden information revealed/not revealed in accordance with the user's selections and then forward the modified electronic document to the native application to be opened and displayed to the user with the hidden information revealed.

Alternatively, the reveal hidden information application could function such that when an electronic document native to one of the applications is opened using the selected hidden information types, the reveal hidden information application passes the reveal/not reveal settings made using the above-described menus to the native application (e.g., via an application programming interface) so that the document is displayed in the native application in accordance with these reveal/not reveal settings. Unless the document is saved after being opened with the passed reveal/not reveal settings, the settings in the electronic document may revert to their original settings when the electronic document is closed.

The reveal hidden information application will temporarily save the modified version of the electronic document so that it may be displayed by the native application, and the modified version of the electronic document may be purged after it is closed in the native application. If a user wants to save a copy of the modified version of the electronic document with the hidden information revealed, a user can select to "save as" when the modified version of the electronic document is open in the native application. Changes made to the modified electronic document will not be made to the original document.

Figure 15:
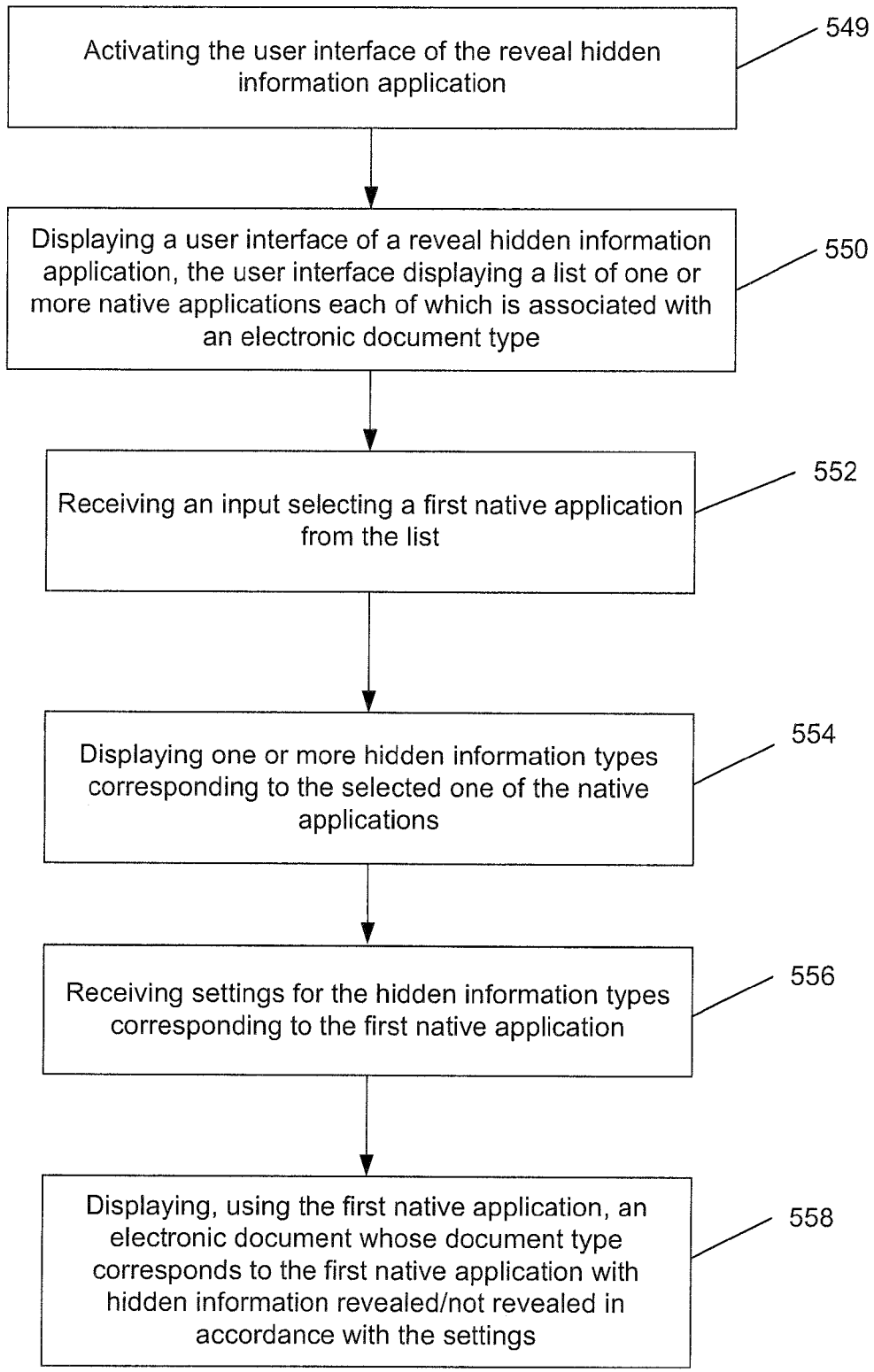
FIG. 15 is a flowchart illustrating a method according to disclosed embodiments.

A flowchart of a method of revealing hidden information in an electronic document is illustrated in FIG. 15. This method may be performed by processor 130 executing instructions stored in memory 120. In step 549, a user may activate the user interface of the reveal hidden information application, as described above. In step 550, a user interface of the reveal hidden information application is displayed, the user interface displaying a list of one or more native applications each of which is associated with an electronic document type. In step 552, user input is received of a first native application from the list.

In step 554, one or more hidden information types corresponding to the selected one of the applications are displayed. In step 556, settings for the hidden information types corresponding to the first native application are received. In step 558, an electronic document whose document type corresponds to the first native application is displayed, using the first native application, with hidden information revealed/not revealed in accordance with the settings.

The disclosed embodiments have been illustrated using electronic documents native to certain applications, and illustrated with certain hidden information types. However, the methods and systems may be utilized with other applications and other hidden information types. For example, electronic documents often have hidden metadata or other hidden information not specifically illustrated herein, and the systems and methods disclosed and claimed herein are usable any other hidden information types or with other applications.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

The processing system/circuitry described in the specification (e.g., processor 130) is "programmed" to control the revealing of hidden information or data in electronic documents in accordance with the "logic" described in this specification. One of ordinary skill in the art will therefore recognize that, for example, a processing system including at least one CPU when executing instructions in accordance this logic operates as "programmed logic circuitry" to perform the operations defined by the logic.

While the methods, system and computer readable medium have been described in connection with what are presently considered to be the most practical and preferred embodiments, it is to be understood that the such are not to be limited to the disclosed embodiments, but on the contrary, are intended to cover various modifications and equivalent arrangements included within the spirit and scope of the technology. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

We claim:

1. A method of revealing hidden information in electronic documents, the method comprising:
displaying a user interface of a reveal hidden information application running on a computer, the user interface displaying a list of two or more native applications each of which is associated with a different electronic document type;
receiving a first input selecting a first native application from the list;
displaying one or more hidden information types corresponding to the selected first native application;
receiving first settings for the hidden information types corresponding to the first native application;
receiving a second input selecting a second native application from the list;
displaying one or more hidden information types corresponding to the selected second native application;
receiving second settings for the hidden information types corresponding to the second native application;
displaying, in the first native application running on a computer, a first electronic document, whose document type corresponds to the first native application, with hidden information revealed/not revealed in accordance with the first settings; and
displaying, in the second native application running on a computer, a second electronic document, whose document type corresponds to the second native application, with hidden information revealed/not revealed in accordance with the second settings.

2. The method according to claim 1, wherein the two or more native applications comprise two or more of a word processing application, a spreadsheet application, a presentation creation application, and/or a data manipulation application.

3. The method according to claim 1, wherein the two or more native applications comprise two or more of Excel®, Word®, PowerPoint®, and/or Acrobat®.

4. The method according to claim 1, wherein the first native application comprises a word processing application, and the displayed hidden information types comprise hidden text, hidden revisions, hidden comments, hidden users, and/or hidden revision dates.

5. The method according to claim 1, wherein the first native application comprises a spreadsheet application, and the displayed hidden information types comprise hidden headings, hidden sheets, hidden rows, hidden columns, hidden tabs, hidden scrollbars, hidden text, filtered data, hidden comments, hidden indicators, hidden gridlines, and/or hidden formulas.

6. The method according to claim 1, wherein first native application comprises a presentation application and the displayed hidden information types comprise hidden slides, hidden shapes, hidden objects and/or hidden notes.

7. The method according to claim 1, wherein the first native application comprises a data manipulation application, and the displayed hidden information types comprise hidden pages panels, hidden optional content, hidden bookmarks panel, and/or hidden attachments panel.

8. The method according to claim 1, further comprising displaying a reveal hidden information settings user interface icon on a user display, and activating the user interface of the reveal hidden information application upon user selection of the reveal hidden information settings user interface icon.

9. A system, comprising:
a memory for storing instructions;
a microprocessor coupled to the memory and to a display, the microprocessor being programmed to reveal hidden information in electronic documents by performing operations comprising:
displaying a user interface of a reveal hidden information application, the user interface configured to receive hidden information settings for two or more native applications each of which is associated with a different electronic document type;
receiving, via the user interface, settings for hidden information types corresponding to at least first and second native applications; and
selectively displaying, in the first and second native applications, electronic documents, whose document types respectively correspond to the first and second native applications, with hidden information revealed/not revealed in accordance with the settings.

10. The system of claim 9, wherein the two or more native applications comprise two or more of a word processing application, a spreadsheet application, a presentation creation application, and/or a data manipulation application.

11. The system of claim 9, wherein the two or more native applications comprise two or more of Excel®, Word®, PowerPoint®, and/or Acrobat®.

12. The system of claim 9, wherein the first native application comprises a word processing application and the displayed hidden information types comprise hidden text, hidden revisions, hidden comments, hidden users, and/or hidden revision dates.

13. The system of claim 9, wherein the first native application comprises a spreadsheet application and the displayed hidden information types comprise hidden headings, hidden sheets, hidden rows, hidden columns, hidden tabs, hidden scrollbars, hidden text, filtered data, hidden comments, hidden indicators, hidden gridlines, and/or hidden formulas.

14. The system of claim 9, wherein the first native application comprises a presentation application and the displayed hidden information types comprise hidden slides, hidden shapes, hidden objects and/or hidden notes.

15. The system of claim 9, wherein the first native application comprises a data manipulation application and the displayed hidden information types comprise hidden pages panels, hidden optional content, hidden bookmarks panel, and/or hidden attachments panel.

16. The system of claim 9, wherein the microprocessor is further programmed to display a reveal hidden information settings user interface icon on a user display, and activate the user interface in response to receiving an input for selecting the hidden information settings user interface icon.

17. A non-transitory computer readable medium having encoded therein instructions for a reveal hidden information application for revealing hidden information in electronic documents, the instructions comprising instructions which, when executed, cause at least one computer to perform operations comprising:
displaying a user interface configured to receive hidden information settings for two or more native applications each of which is associated with a different electronic document type;
receiving, via the user interface, settings for hidden information types corresponding to at least first and second native applications; and
selectively displaying, in the first and second native applications, electronic documents, whose document types respectively correspond to the first and second native applications, with hidden information revealed/not revealed in accordance with the settings.

18. The non-transitory computer readable medium of claim 17, wherein the instructions further comprise instructions for displaying a reveal hidden information settings user interface icon on a user display, and activating the user interface in response to an input for selecting the hidden information settings user interface icon.

19. The non-transitory computer readable medium of claim 17, comprising a semiconductor memory.

20. A method of revealing hidden information in electronic documents, comprising:
displaying a user interface of a reveal hidden information application running on a computer, the user interface displaying a list of two or more native applications each of which is associated with a different electronic document type;
receiving a first input selecting a first native application from the list;
displaying one or more hidden information types corresponding to the selected one of the applications;
receiving first settings for the hidden information types corresponding to the first native application;
receiving a second input selecting a second native application from the list;
displaying one or more hidden information types corresponding to the selected second native application;
receiving second settings for the hidden information types corresponding to the second native application;
creating, using the reveal hidden information application, a modified version of a first electronic document whose document type corresponds to the first native application, the modified version of the first electronic document with hidden information being revised to be revealed/not revealed in accordance with the first settings when the modified version of the first electronic document is displayed;

creating, using the reveal hidden information application, a modified version of a second electronic document whose document type corresponds to the second native application, the modified version of the second electronic document with hidden information being revised to be revealed/not revealed in accordance with the second settings when the modified version of the second electronic document is displayed;

providing access to the modified version of the first electronic document to the first native application running on the computer; and providing access to the modified version of the second electronic document to the second native application running on the computer.

21. The method of claim 20, wherein the two or more native applications comprise two or more of a word processing application, a spreadsheet application, a presentation creation application, and/or a data manipulation application.

22. The method of claim 20, further comprising displaying a reveal document icon that when selected causes displaying of the modified version of the electronic document.

23. A non-transitory computer readable medium having encoded therein instructions for a reveal hidden information application for revealing hidden information in an electronic document, the instructions comprising instructions for which, when executed, cause at least one computer to perform operations comprising:

causing display of a user interface configured to receive hidden information settings for two or more native applications each of which is associated with a different electronic document type;

receiving, via the user interface, settings for hidden information types corresponding to at least first and second native applications;

creating, using the reveal hidden information application, modified versions of first and second electronic documents whose document types respectively correspond to the first and second native applications, the modified versions of the first and second electronic documents with hidden information being revised to be revealed/not revealed in accordance with the settings when the modified versions of the first and second electronic documents are displayed; and providing access to the modified versions of the first and second electronic documents to the first and second native applications, respectively, running on a computer.

24. The non-transitory computer readable medium of claim 23, wherein the two or more native applications comprise two or more of a word processing application, a spreadsheet application, a presentation creation application, and/or a data manipulation application.

25. The non-transitory computer readable medium of claim 23, wherein the instructions further comprise instructions for displaying a reveal document icon that when selected causes display of the modified version of the electronic document.

* * * * *